United States Patent
Blake et al.

(10) Patent No.: US 12,334,780 B2
(45) Date of Patent: Jun. 17, 2025

(54) ELECTRONICALLY COMMUTATED MOTOR ZERO-WATT STANDBY POWER CONSUMPTION

(71) Applicant: Carrier Corporation, Palm Beach Gardens, FL (US)

(72) Inventors: Jonathan Blake, Newington, CT (US); Luis Arnedo, South Glastonbury, CT (US); Michael S. Smyth, Andrews, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 336 days.

(21) Appl. No.: 17/864,604

(22) Filed: Jul. 14, 2022

(65) Prior Publication Data

US 2023/0015685 A1    Jan. 19, 2023

Related U.S. Application Data

(60) Provisional application No. 63/223,044, filed on Jul. 18, 2021.

(51) Int. Cl.
  *H02K 11/04* (2016.01)
  *H02K 11/20* (2016.01)
  *H02K 11/30* (2016.01)

(52) U.S. Cl.
  CPC .......... *H02K 11/04* (2013.01); *H02K 11/20* (2016.01); *H02K 11/30* (2016.01); *Y02B 30/70* (2013.01)

(58) Field of Classification Search
  CPC ........ H02K 11/20; H02K 11/30; H02K 11/04; H02P 27/047; F24F 1/00; F24F 3/00;
  (Continued)

(56) References Cited

U.S. PATENT DOCUMENTS

| 2011/0018349 A1 | 1/2011 | Rockenfeller et al. |
| 2016/0116180 A1 | 4/2016 | Hu |

(Continued)

FOREIGN PATENT DOCUMENTS

| EP | 3739274 | 11/2020 | |
| EP | 3825617 A1 * | 5/2021 | ............. F24F 11/46 |

OTHER PUBLICATIONS

European Search Report for Application No. 22184525.8; Issued Nov. 28, 2022; 10 Pages.

*Primary Examiner* — Christopher M Koehler
*Assistant Examiner* — Viswanathan Subramanian
(74) *Attorney, Agent, or Firm* — CANTOR COLBURN LLP

(57) ABSTRACT

A heating, ventilation, and air conditioning (HVAC) system includes a blower assembly including a blower motor; and an electronically commutated motor (ECM) controller in electrical communication with the blower motor, the ECM controller including: a rectifier electrically connected to an alternating current (AC) input source, the rectifier being configured to receive AC electricity from the AC input source and convert the AC electricity to direct current (DC) electricity; a DC electrical circuit including a first DC electrical circuit loop and a second DC electrical circuit loop, the rectifier being configured to circulate the DC electricity through the DC electrical circuit; and a relay located within the first DC electrical circuit loop, the relay being configured to open to break the first DC electrical circuit loop and close to complete the first DC electrical circuit loop in order to reduce standby power consumption of the ECM controller.

16 Claims, 3 Drawing Sheets

(58) Field of Classification Search
CPC .. F24F 11/46; F24F 11/77; F24F 11/88; F24F 11/89
See application file for complete search history.

(56) References Cited

U.S. PATENT DOCUMENTS

2020/0153364 A1 5/2020 Guo
2020/0408430 A1* 12/2020 Yamakawa ............. H02P 27/06

* cited by examiner

ELECTRONICALLY COMMUTATED MOTOR ZERO-WATT STANDBY POWER CONSUMPTION

CROSS-REFERENCE TO RELATED APPLICATIONS

This application claims the benefit of Provisional Application No. 63/223,044 filed Jul. 18, 2021, the disclosure of which is incorporated herein by reference in its entirety.

BACKGROUND

The embodiments herein generally relate to a heating, ventilation, and air conditioning (HVAC) system and more specifically to a system and method for monitoring an air filter in an HVAC system.

Modern structures, such as office buildings and residences, utilize heating, ventilation, and air conditioning (HVAC) systems having controllers that allow users to control the environmental conditions within these structures. These controllers have evolved over time from simple temperature based controllers to more advanced programmable controllers, which allow users to program a schedule of temperature set points in one or more environmental control zones for a fixed number of time periods as well as to control the humidity in the control zones, or other similar conditions. Typically, these HVAC systems use an air handler that includes a motor and a fan to deliver the conditioned air to an interior space.

These motors commonly utilize an integrated or external variable frequency drive (VFD) to drive a permanent magnet motor. However, since the VFD traditionally remains connected to an AC input source, a constant standby power consumption is typically present, even when the blower motor is not running. This results in increased energy cost and carbon consumption. Accordingly, there remains a need to a solution to reduce energy consumption during standby (i.e., when the blower motor is not running).

BRIEF DESCRIPTION

According to one embodiment, a heating, ventilation, and air conditioning (HVAC) system is provided. The HVAC system including: a blower assembly including a blower motor; and an electronically commutated motor (ECM) controller in electrical communication with the blower motor, the ECM controller including: a rectifier electrically connected to an alternating current (AC) input source, the rectifier being configured to receive AC electricity from the AC input source and convert the AC electricity from the AC input source to direct current (DC) electricity; a DC electrical circuit including a first DC electrical circuit loop and a second DC electrical circuit loop, the rectifier being configured to circulate the DC electricity through the DC electrical circuit; and a relay located within the first DC electrical circuit loop, the relay being configured to open to break the first DC electrical circuit loop and close to complete the first DC electrical circuit loop in order to reduce standby power consumption of the ECM controller.

In addition to one or more of the features described above, or as an alternative, further embodiments of the transport refrigeration system may include a DC-to-DC converter electrically connected the rectifier, the DC-to-DC converter being configured to receive the DC electricity at a first voltage from the rectifier and convert the DC electricity from the first voltage to at least one of a second voltage or a third voltage, the second voltage and the third voltage being less than the first voltage; a rectifier-to-converter line electrically connecting the rectifier to the DC-to-DC converter, wherein DC electricity is configured to flow from the rectifier to the DC-to-DC converter through the rectifier-to-converter line; and a converter-to-rectifier line electrically connecting the DC-to-DC converter to the rectifier, wherein the DC electricity is configured to flow from the DC-to-DC converter to the rectifier through the converter-to-rectifier line, wherein the relay is located within the converter-to-rectifier line, the relay being configured to open the first DC electrical circuit loop within the converter-to-rectifier line and close the first DC electrical circuit loop within the converter-to-rectifier line.

In addition to one or more of the features described above, or as an alternative, further embodiments of the transport refrigeration system may include an equipment control board configured to transmit an activation signal to the relay and close the relay to complete the first DC electrical circuit loop.

In addition to one or more of the features described above, or as an alternative, further embodiments of the transport refrigeration system may include that the equipment control board is configured to transmit the activation signal to the relay to close the relay and complete the first DC electrical circuit loop when activation of the blower motor is desired.

In addition to one or more of the features described above, or as an alternative, further embodiments of the transport refrigeration system may include an equipment control board or a system control unit configured to transmit an activation signal to the relay to close the relay and complete the first DC electrical circuit loop.

In addition to one or more of the features described above, or as an alternative, further embodiments of the transport refrigeration system may include that the equipment control board is configured to transmit the activation signal to the relay to close the relay and complete the first DC electrical circuit loop when activation of the blower motor is desired.

In addition to one or more of the features described above, or as an alternative, further embodiments of the transport refrigeration system may include an inverter electrically connected to the rectifier and the DC-to-DC converter, the inverter configured to change the DC electricity received from the rectifier and the DC-to-DC converter to AC converted electricity and provide said AC converted electricity to the blower motor.

In addition to one or more of the features described above, or as an alternative, further embodiments of the transport refrigeration system may include: a converter-to-processor line; a processor-to-inverter line; and a processor electrically connected to the DC-to-DC converter through the converter-to-processor line, the processor being configured to receive DC electricity at the third voltage from the DC-to-DC converter, wherein the processor is electrically connected to the inverter through the processor-to-inverter line and is configured to transmit a blower activation signal to the blower motor through the processor-to-inverter line and the inverter.

In addition to one or more of the features described above, or as an alternative, further embodiments of the transport refrigeration system may include an equipment control board configured to transmit an activation signal to the relay to close the relay and complete the first DC electrical circuit loop, wherein the equipment control board is configured to transmit a blower activation signal to the processor.

In addition to one or more of the features described above, or as an alternative, further embodiments of the transport refrigeration system may include that the equipment control board is configured to transmit the activation signal to the relay to close the relay and complete the first DC electrical circuit loop when activation of the blower motor is desired.

According to another embodiment, a method of operating a heating, ventilation, and air conditioning (HVAC) system is provided. The method including transmitting an activation signal to a relay located within a first DC electrical circuit loop in a DC electrical circuit of an electronically commutated motor (ECM) controller, the relay being configured to close and complete the first DC electrical circuit loop in response to the activation signal; and operating a blower motor using electricity from the DC electrical circuit.

In addition to one or more of the features described above, or as an alternative, further embodiments of the transport refrigeration system may include converting, using an inverter, DC electricity from the DC electrical circuit to AC converted electricity; and providing, using the inverter, the AC converted electricity to the blower motor.

In addition to one or more of the features described above, or as an alternative, further embodiments of the transport refrigeration system may include receiving, using a rectifier, AC electricity from an AC input source; converting, using the rectifier, the AC electricity from the AC input source to DC electricity; and providing, using the rectifier, the DC electricity to the DC electrical circuit.

In addition to one or more of the features described above, or as an alternative, further embodiments of the transport refrigeration system may include receiving, using a DC-to-DC converter, the DC electricity from the rectifier at a first voltage; converting, using the DC-to-DC converter, the DC electricity from the first voltage to at least one of a second voltage and a third voltage, the second voltage and the third voltage being less than the first voltage; and providing, using the DC-to-DC converter, the DC electricity at the second voltage to the rectifier via a converter-to-rectifier line, wherein the relay is located within the converter-to-rectifier line, the relay being configured to open the first DC electrical circuit loop within the converter-to-rectifier line and close the first DC electrical circuit loop within the converter-to-rectifier line.

In addition to one or more of the features described above, or as an alternative, further embodiments of the transport refrigeration system may include transmitting a blower activation signal to a processor within the DC electrical circuit, the processor being configured to receive the DC electricity at the third voltage from the DC-to-DC converter, wherein the processor is electrically connected to an inverter through the processor-to-inverter line; and transmitting, using the processor, the blower activation signal to the blower motor through the processor-to-inverter line and the inverter.

In addition to one or more of the features described above, or as an alternative, further embodiments of the transport refrigeration system may include that the activation signal is configured to be transmitted when the blower activation signal is transmitted.

According to another embodiment, a computer program product embodied on a non-transitory computer readable medium, the computer program product including instructions that, when executed by a processor, cause the processor to perform operations including: transmitting an activation signal to a relay located within a first DC electrical circuit loop in a DC electrical circuit of an electronically commutated motor (ECM) controller, the relay being configured to close and complete the first DC electrical circuit loop in response to the activation signal; and operating a blower motor using electricity from the DC electrical circuit.

In addition to one or more of the features described above, or as an alternative, further embodiments of the transport refrigeration system may include transmitting a blower activation signal to a processor within the DC electrical circuit, the processor being electrically connected to an inverter through a processor-to-inverter line, wherein the inverter is configured to convert the DC electricity from the DC electrical circuit to AC converted electricity and provide said AC converted electricity to the blower motor; and transmitting, using the processor, the blower activation signal to the blower motor through the processor-to-inverter line and the inverter.

In addition to one or more of the features described above, or as an alternative, further embodiments of the transport refrigeration system may include that the activation signal is configured to be transmitted when the blower activation signal is transmitted.

In addition to one or more of the features described above, or as an alternative, further embodiments of the transport refrigeration system may include that the relay is located in converter-to-rectifier line electrically connecting a DC-to-DC converter and a rectifier within the first DC electrical circuit loop, and wherein the relay is configured to open the first DC electrical circuit loop within the converter-to-rectifier line and close the first DC electrical circuit loop within the converter-to-rectifier line.

Technical effects of embodiments of the present disclosure include closing a direct current electrical circuit in an ECM controller only when operation of the blower motor 115 is required.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

An ECM for a heating, ventilation, and air conditioning (HVAC) system utilizes a pulse width modulation (PWM) signal to communicate with the furnace or fan coil system control board or ECM controller. The ECM controller may be provided with a three phase electrical current to control operation. The ECM controller may be a variable frequency drive (VFD) configured to control a blower motor of the HVAC system using the three phase electrical current. In traditional systems, the ECM controller may remain connected to an AC input source and constantly consume power even when the blower motor is not in operation, thereby increasing energy costs and carbon consumption. Embodiments disclosed herein incorporate a relay into the ECM controller to control when the ECM controller consumes power.

Figure 1:
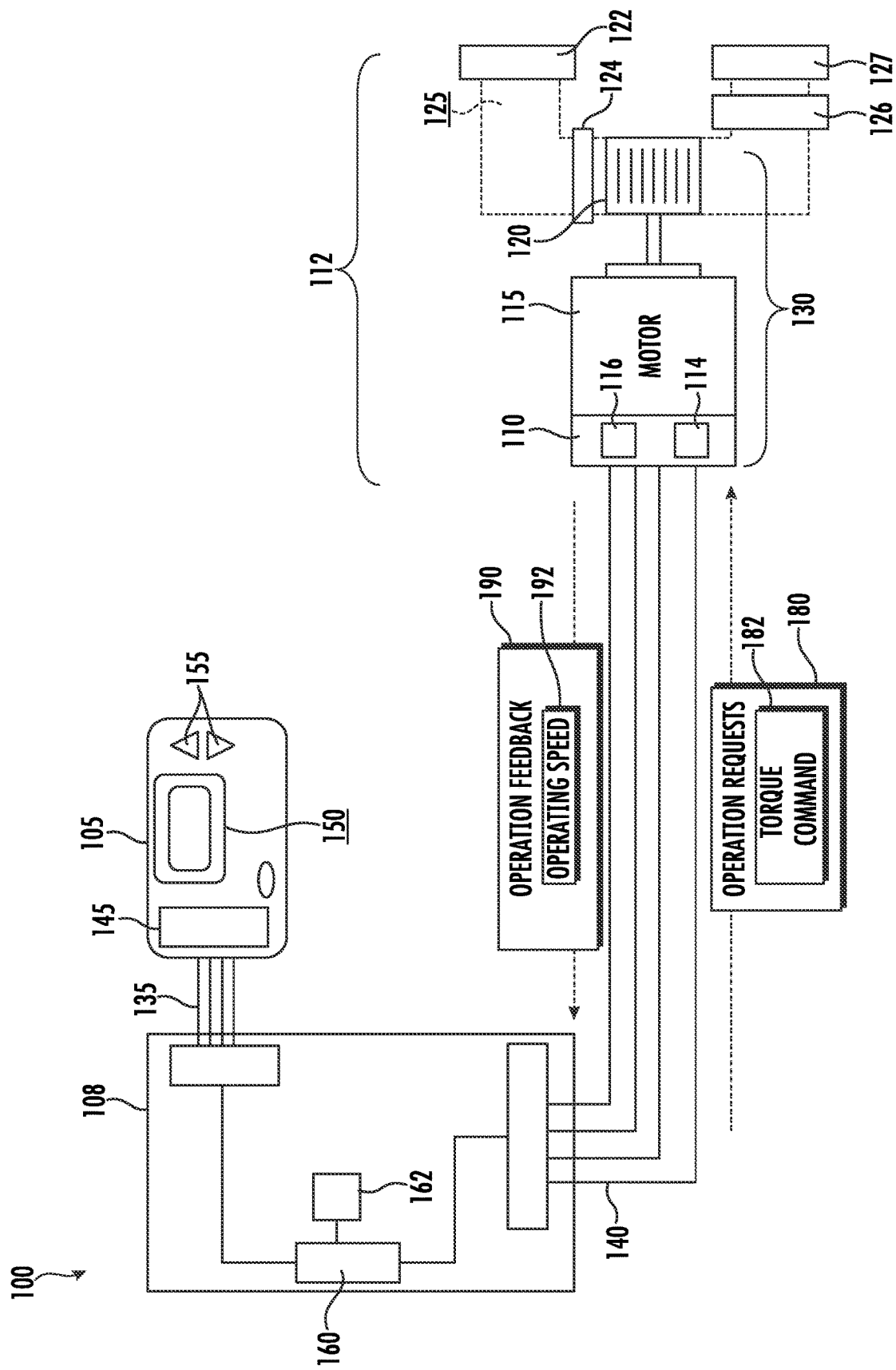
FIG. 1 is a schematic illustration of a heating, ventilation, and air conditioning (HVAC) system, according to an embodiment of the present disclosure.

Referring now to the drawings, FIG. 1 illustrates a schematic view of an HVAC system 100 according to an embodiment of the present disclosure. Particularly, the HVAC system 100 includes a system controller or system control unit 105, an equipment control board 108, an ECM controller 110, and a blower assembly 130 (as part of an air handler 112) having a blower motor 115 and a centrifugal blower unit 120 connected to the duct system 125.

As shown, HVAC system 100 operates to heat or cool an environment 122. An air handler unit 124, such as a furnace or fan coil, is provided with air from an inlet air duct 127. Typically, an air filter 126 is placed on the inlet air duct 127, and upstream of the blower unit 120. The air filter 126 is configured to filter airflow through the duct system 125. The blower unit 120 pulls air through the inlet air duct 127, air filter 126, and through the air handler unit 124.

In an embodiment, the blower motor 115 may be a dual motor ECM. The system control unit 105 is in operative communication with the equipment control board 108 over system communication bus 135, which communicates signals between the system control unit 105 and the equipment control board 108. As a result of the bi-directional flow of information between the system control unit 105 and the equipment control board 108, the algorithms described in illustrated embodiments may be implemented in either control unit 105 or the equipment control board 108. Also, in some embodiments, certain aspects of the algorithms may be implemented in control unit 105 while other aspects may be implemented in the ECM controller 110 or the equipment control board 108.

In one embodiment, the system control unit 105 includes a computing system 145 having a program stored on nonvolatile memory to execute instructions via a microprocessor related to aspects of an airflow rate algorithm to determine the predicted operating parameters of air volume flow, air mass flow, external static pressure load, and operating power consumption of the blower unit 120 in HVAC system 100. In embodiments, the microprocessor may be any type of processor (CPU), including a general purpose processor, a digital signal processor, a microcontroller, an application specific integrated circuit, a field programmable gate array, or the like.

The system control unit 105 of the illustrated embodiment includes a user interface element 150 such as, for example, a graphic user interface (GUI), a CRT display, a LCD display, or other similar type of interface by which a user of the HVAC system 100 may be provided with system status and/or the determined operating parameters of the air handler 112. Also, the system control unit 105 includes a user input element 155 by which a user may change the desired operating characteristics of the HVAC system 100, such as airflow requirements. The user may also enter certain specific aspects of the air handler 112 installation such as, for example, the local altitude for operation of the air handler 112, which may be used in the various algorithms. It is to be appreciated that the system control unit 105 implements aspects of an airflow control algorithm for determining, in an embodiment, the operating parameters including air volume flow rate or air mass flow rate, the blower unit 120 power consumption, and duct static pressure at the extremes of the operating range of the blower motor 115 (e.g., at or near maximum motor RPM). The determination of these operating parameters through the algorithms eliminates a need to measure these parameters against published parameters, thereby providing for self-certification of the air handler 112 and diagnostics of the HVAC system 100. The equipment control board 108 may be located inside of the air handler. The determined operating parameters may be compared to published, expected parameters to provide a certification that the air handler 112 meets the published parameters. It should be appreciated that while aspects of the algorithms described above may be executed in the ECM controller 110, in other embodiments, any of the above algorithms may also be executed in the system control unit 105 without departing from the scope of the disclosure.

Also shown, HVAC system 100 includes the equipment control board 108 operably connected to the blower assembly 130 for transmitting operation requests 180 to the blower assembly 130. The equipment control board 108 may be operably connected to the ECM controller 110. The equipment control board 108 includes a processor 160 and a memory 162, which stores operational characteristics of blower assembly 130 that are specific to the model of the air handler unit 124 being used. In some non-limiting embodiments, the operational characteristics include blower diameter, blower operating torque, a cabinet size of the air handler unit 124, and a motor power rating of the blower motor 115.

In one embodiment, the equipment control board 108 transmits operation requests 180 to the ECM controller via a motor communication bus 140. The ECM controller 110 is configured to receive the operation requests 180 and control the blower motor 115 in accordance with the operation requests 180. The ECM controller 110 may also include an associated memory 116 and processor 114. The ECM controller 110 may be an electronic controller including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The operation requests 180 includes a torque command 182. In one embodiment, the equipment control board 108 receives operation feedback 190 from the ECM controller 110 of blower motor 115 via the motor communication bus 140. The operation feedback 190 includes an operating speed 192 of the blower motor 115. In order to determine the operating speed 192 of the blower motor 115, the motor control algorithm provides sinusoidal phases currents to the blower motor 115 and the operating speed 192 of the blower motor 115 is directly related to the frequency of the phase currents. The assumption is that the motor is operating in its normal condition where rotor is synched with the rotating magnetic field of the stator.

The ECM controller 110 receives the torque commands 182 from the equipment control board 108 and impels blades of the blower unit 120 at the commanded motor operating torque. In an embodiment, the processor 160 of the equipment control board 108 implements one or more algorithms for determining the air volume flow rate, air mass flow rate, the static pressure in the duct system 125 over the full range of duct restrictions and airflow range, and operating power consumption by the blower assembly 130 based on the specific characteristic constants of the air handler unit 124 including characteristics of the specific blower motor 115 and blower unit 120 being used.

In an embodiment, for an operating mode of the HVAC system 100, the system control unit 105 communicates to the equipment control board 108a command for a desired indoor airflow. The desired indoor airflow depends on user settings such as, for example, the current operating mode, such as heating, cooling, dehumidification, humidification, circulation fan, outside fresh air intake, etc., the number of stages of heating or cooling, and other factors. In some other operating modes, such as gas heating or electric heating, the system control unit 105 commands the stages of heat and the equipment control board 108 determines the corresponding desired indoor airflow.

Also, the equipment control board 108 is in direct communication with the blower assembly 130 over motor communication bus 140, which serves to transmit, in one embodiment, torque commands 182 from the equipment control board 108 to the blower assembly 130. It will be appreciated that the blower assembly 130 may send operation feedback 190 to the equipment control board 108 such as, in one non-limiting example, the operating speed 192. In an embodiment, the equipment control board 108 is configured to determine the torque command 182 values for the blower motor 115. Further, in an embodiment, the equipment control board 108 is configured to determine the external static pressure in the duct system 125 that is external to the air handler unit 124.

Figure 2:
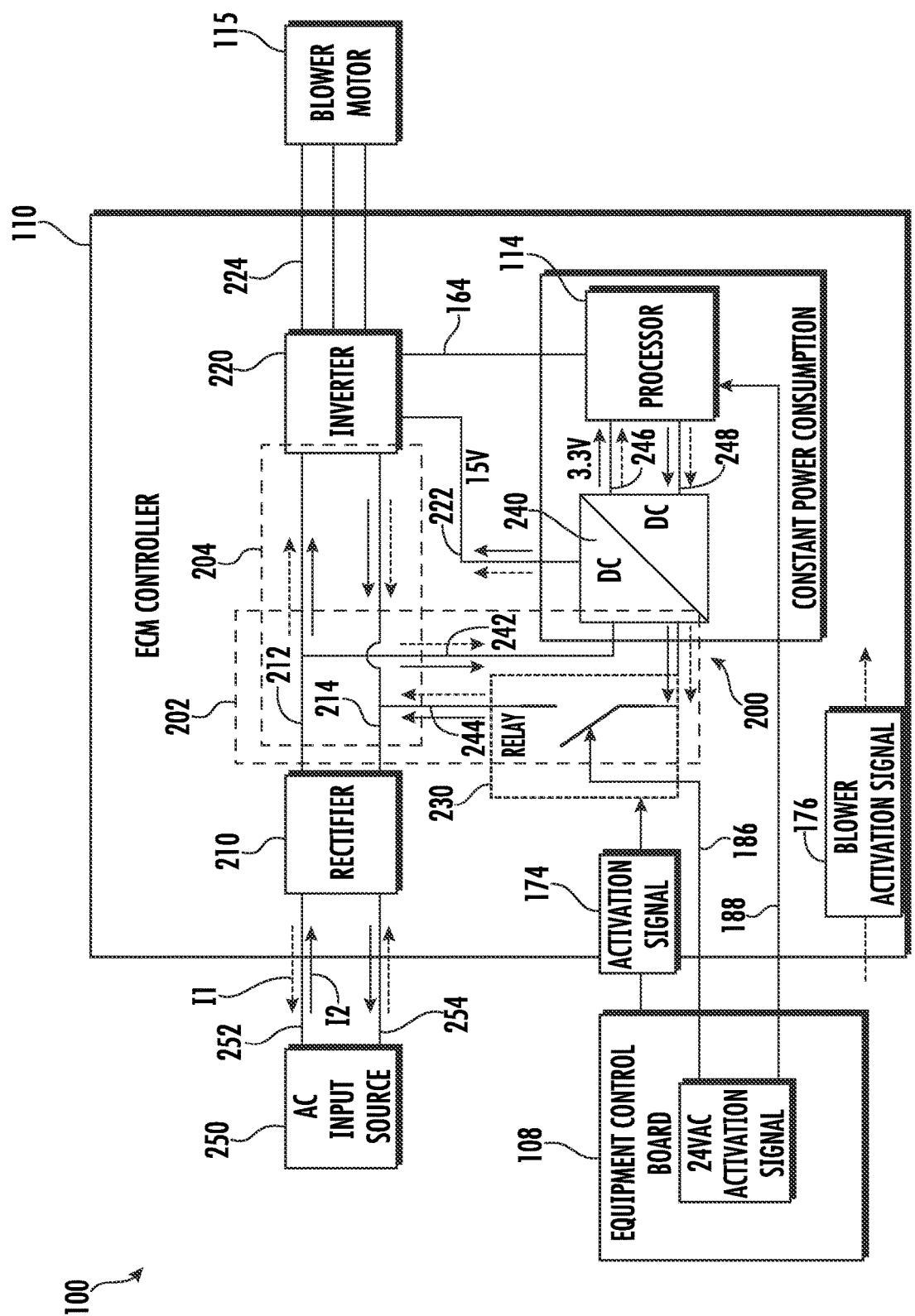
FIG. 2 illustrates a schematic illustration of an ECM controller of the HVAC system, according to an embodiment of the present disclosure.

Referring now to FIG. 2, with continued reference to FIG. 1, a schematic illustration of the ECM controller 110 within the HVAC system 100 is illustrated, in accordance with an embodiment of the present disclosure. An alternating current (AC) input source 250 is configured to provide AC electricity to the ECM controller 110. The AC electricity provided to the ECM controller 110 includes a positive half-cycle and a negative half-cycle. The first current flow direction I1 represents the flow of electrical current in the HVAC system 100 during the positive half-cycle and the second current flow direction I2 represents the flow of electrical current in HVAC system 100 during the negative half-cycle. The ECM controller 110 include a direct current (DC) circuit 200 discussed further herein.

The ECM controller 110 includes a rectifier 210, an inverter 220, a DC-to-DC converter 240, the processor 114, and a relay 230. The rectifier 210 is electrically connected to the AC input source 250 through a first AC input line 252 and a second AC input line 254. The AC input source 250 is configured to provide AC electricity to the rectifier 210. The rectifier 210 is configured to receive AC electricity from the AC input source 250 and the rectifier 210 is configured to convert the AC electricity to DC electricity.

The inverter 220 is electrically connected to the rectifier 210 through a rectifier-to-inverter line 212 and an inverter-to-rectifier line 214. DC electricity is configured to flow from the rectifier 210 to the inverter 220 through the rectifier-to-inverter line 212. DC electricity is configured to flow from the inverter 220 to the rectifier 210 through the inverter-to-rectifier line 214.

The DC-to-DC converter 240 is electrically connected to the rectifier 210. The DC-to-DC converter 240 is configured to receive DC electricity at a first voltage from the rectifier 210 and convert the DC electricity from the first voltage to at least one of a second voltage or a third voltage. The second voltage and the third voltage may be both less than the first voltage. In another embodiment, the DC-to-DC converter 240 may be a boost converter and at least one of the second voltage and the third voltage may be greater than the first voltage.

The DC-to-DC converter 240 is configured to receive DC electricity from the rectifier 210, convert the voltage of the DC electricity from the rectifier 210, and provide the DC electricity at a reduced or increased voltage to the inverter 220. The DC-to-DC converter 240 is configured to convert the DC electricity from the first voltage to the second voltage. In an embodiment, the first voltage is greater than the second voltage, thus the DC-to-DC converter 240 is configured to reduce the voltage of the DC electricity from the first voltage to the second voltage. The DC-to-DC converter 240 may be configured to provide reduced voltage DC electricity to the inverter 220 at the second voltage. In an embodiment, the second voltage is 15V.

The DC-to-DC converter 240 is configured to receive DC electricity from the rectifier 210, reduce the voltage of the DC electricity from the rectifier 210, and provide the DC electricity at a reduced voltage to the processor 114. The DC-to-DC converter 240 is configured to convert the DC electricity from the first voltage to the third voltage. In an embodiment, the first voltage is greater than the third voltage, thus the DC-to-DC converter 240 is configured to reduce the voltage of the DC electricity from the first voltage to the third voltage. The DC-to-DC converter 240 may be configured to provide reduced voltage DC electricity to the processor 114 at the third voltage. In an embodiment, the third voltage is 3.3V. In one embodiment, the DC-to-DC converter 240 may have two direct outputs to produce a third voltage that is different than the second voltage. In another embodiment, there may be a separate linear regulator to produce a third voltage that is different than the second voltage. The separate linear regulator may be located between the DC-to-DC converter 240 and the processor 114 or between the DC-to-DC converter 240 and the inverter 220.

The rectifier 210 is electrically connected to the DC-to-DC converter 240 through a rectifier-to-converter line 242. The DC-to-DC converter 240 is electrically connected to the rectifier 210 through a converter-to-rectifier line 244. DC electricity is configured to flow from the rectifier 210 to the DC-to-DC converter 240 through the rectifier-to-converter line 242. DC electricity is configured to flow from the DC-to-DC converter 240 to the rectifier 210 through the converter-to-rectifier line 244. The rectifier-to-converter line 242 may be electrically connected to the rectifier-to-inverter line 212, as illustrated in FIG. 2. The converter-to-rectifier line 244 may be electrically connected to the inverter-to-rectifier line 214. The DC bus potential between rectifier-to-converter line 242 and the converter-to-rectifier line 244 may be 340VDC nominal.

The inverter 220 is electrically connected to the DC-to-DC converter 240 through a converter-to-inverter line 222. DC electricity is configured to flow from the DC-to-DC converter 240 to the inverter 220 through the converter-to-inverter line 222. The inverter 220 is configured to change DC electricity received from the rectifier 210 and the DC-to-DC converter 240 to AC converted electricity. The blower motor 115 is electrically connected to the inverter 220 through an inverter-to-blower motor line 224 and the inverter 220 is configured to provide the AC converted electricity to the blower motor 115 through the inverter-to-blower motor line 224.

The processor 114 is electrically connected to the DC-to-DC converter 240 through a converter-to-processor line 246 and a processor-to-converter line 248. DC electricity is configured to flow from the DC-to-DC converter 240 to the processor 114 through the converter-to-processor line 246. DC electricity is configured to flow from processor 114 to the DC-to-DC converter 240 through the processor-to-converter line 248.

The processor 114 is electrically connected to inverter 220 through a processor-to-inverter line 164. The processor 114 is configured to transmit electrical signals or commands for the blower motor 115 through the processor-to-inverter line 164.

The ECM controller 110 includes a DC electrical circuit 200. The DC electrical circuit 200 includes the rectifier 210, the rectifier-to-inverter line 212, the inverter-to-rectifier line 214, the inverter 220, the DC-to-DC converter 240, the rectifier-to-converter line 242, the converter-to-rectifier line 244, the processor 114, the converter-to-processor line 246, and the processor-to-converter line 248. It is understood that the DC electrical circuit 200 may include more or less components, as required.

The DC electrical circuit 200 may include a first DC electrical circuit loop 202 and a second DC electrical circuit loop 204. The first DC electrical circuit loop 202 may comprise at least the rectifier 210, the rectifier-to-converter line 242, the DC-to-DC converter 240, and the converter-to-rectifier line 244. The second DC electrical circuit loop 204 may comprise at least the rectifier 210, the rectifier-to-inverter line 212, the inverter 220, and the inverter-to-rectifier line 214. The first DC electrical circuit loop 202 may be considered a high voltage loop and the second DC electrical circuit loop 204 may be considered a high voltage loop. The voltage of the first DC electrical circuit loop 202 may be equivalent to the voltage of the second DC electrical circuit loop 204.

The rectifier 210 is configured to circulate DC electricity through the DC electrical circuit 200. The relay 230 is located within the first DC electrical circuit loop 202 of the DC electrical circuit 200. The relay 230 may be an electromechanical device or a solid state device. The relay 230 is configured to open and close the first DC electrical circuit loop 202. The relay 230 may be located within the converter-to-rectifier line 244. Advantageously, locating the relay 230 in the converter-to-rectifier line 244 after the DC-to-DC converter 240 reduces the voltage of the DC electricity, the relay 230 will have to withstand a lower voltage than in other parts of the DC electrical circuit 200. In an embodiment, the relay 230 is located in series with the rectifier-to-converter line 242 and/or the converter-to-rectifier line 244.

The relay 230 is configured to open to break the first DC electrical circuit loop 202 and close to complete the first DC electrical circuit loop 202 within the converter-to-rectifier line 244 when commanded by the equipment control board 108 in order to reduce standby power consumption of the ECM controller 110. The relay 230 controls electrical current flow from the rectifier 210 to the DC-to-DC controller 240. If the relay 230 is open then electrical current does not flow from the rectifier 210 to the DC-to-DC controller 240 but if the relay 230 is closed then current is allowed to flow from the rectifier 210 to the DC-to-DC controller 240.

The equipment control board 108 is electrically connected to the relay 230 through a system control unit-to-relay line 186. The equipment control board 108 is configured to transmit an activation signal 174 to the relay 230 to close the relay 230 and complete the first DC electrical circuit loop 202. In another embodiment, the system control unit 105 may be configured to transmit an activation signal 174 to the relay 230 to close the relay 230 and complete the first DC electrical circuit loop 202. The activation signal 174 may be a 24VAC signal. The equipment control board 108 may only close the relay 230 to complete the first DC electrical circuit loop 202 when activation of the blower motor 115 is desired. Advantageously, if the relay 230 is open then electrical current is not allowed to flow from the AC input source 250 to the ECM controller 110 and thus no energy is wasted.

The equipment control board 108 is electrically connected to the processor through a system control unit-to-processor line 188. The equipment control board 108 is configured to transmit a blower activation signal 176 to the processor 114 in order for the processor 114 to activate the blower motor 115. The blower activation signal 176 could be discrete voltage inputs (e.g. ~24VAC), a PWM command, or digital communication. The blower activation signal 176 may be an operation request 180 including a torque command 182 requesting that the blower motor 115. be operated at a desired torque.

Figure 3:
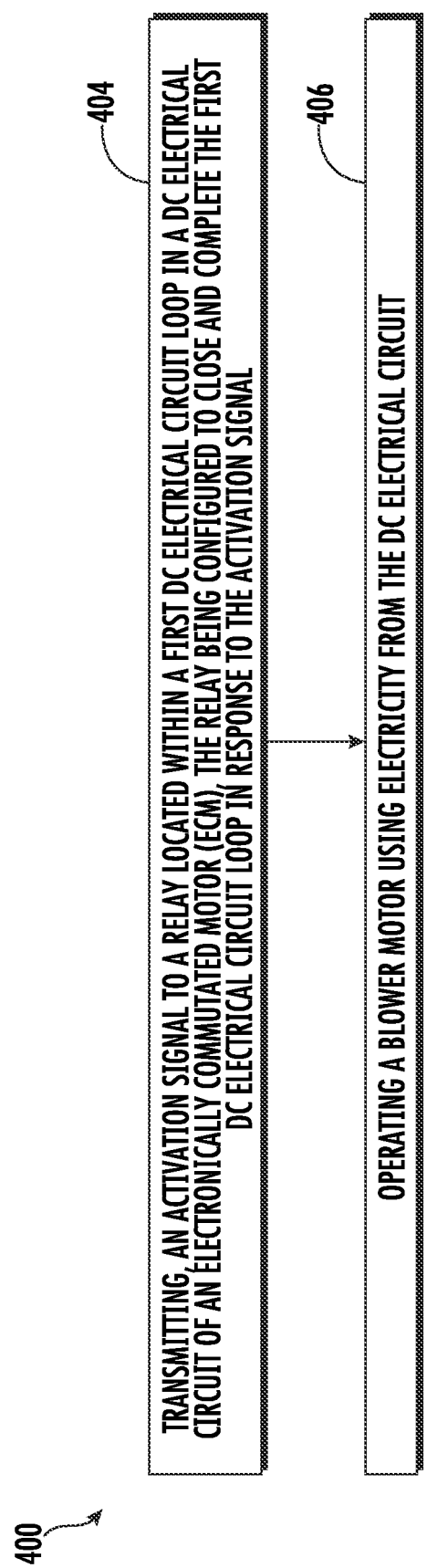
FIG. 3 is a flow diagram illustrating a method of operating the HVAC system of FIG. 1, according to an embodiment of the present disclosure.

Referring now to FIG. 3, with continued reference to FIGS. 1-2. FIG. 4 shows a flow process illustrating a method 400 of operating an HVAC system 100, according to an embodiment of the present disclosure. In an embodiment, the method 400 may be performed by the ECM controller 110.

At block 404, an activation signal 174 is transmitted to a relay 230 located within a first DC electrical circuit loop 202 in a DC electrical circuit 200 of an ECM controller 110. The relay 230 is configured to close and complete the first DC electrical circuit loop 202 in response to the activation signal 174, thus allowing the flow of DC electricity through the first DC electrical circuit loop 202. A rectifier 210 receives AC electricity from an AC input source 250, converts the AC electricity from the AC input source 250 to DC electricity, and provides the DC electricity to the first DC electrical circuit loop 202.

A DC-to-DC converter 240 receives the DC electricity from the rectifier 210 at a first voltage and converts the DC electricity from the first voltage to at least one of a second voltage and a third voltage. The second voltage and the third voltage being less than the first voltage. The DC-to-DC converter 240 then provides the DC electricity at the second voltage to the rectifier 210 via a converter-to-rectifier line 244. The relay 230 is located within the converter-to-rectifier line 244. The relay 230 is configured to open the first DC electrical circuit loop 202 within the converter-to-rectifier line 244 and close the first DC electrical circuit loop 202 within the converter-to-rectifier line 244.

At block 406, a blower motor 115 is operated using electricity from the DC electrical circuit 200. An inverter 220 converts DC electricity from the DC electrical circuit 200 to AC converted electricity and provides the AC converted electricity to the blower motor 115.

The method 400 may further include that a blower activation signal 176 is transmitted to a processor 114 within the DC electrical circuit 200. The processor 114 being configured to receive DC electricity at the third voltage from the DC-to-DC converter 240. The processor 114 is electrically connected to the inverter 220. through the processor-to-inverter line 164. The processor 114 transmits a blower activation signal 176 to the blower motor 115 through the processor-to-inverter line 164 and the inverter 220.

In an embodiment, the activation signal 174 is configured to be transmitted when the blower activation signal 176 is transmitted. The activation signal 174 may only be transmitted when the blower activation signal 176 is transmitted. In an embodiment, the activation signal 174 may be transmitted first and then the blower activation signal 176 may be transmitted after the activation signal 174.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heating, ventilation, and air conditioning (HVAC) system comprising:
    a blower assembly comprising a blower motor; and
    an electronically commutated motor (ECM) controller in electrical communication with the blower motor, the ECM controller comprising:
        a rectifier electrically connected to an alternating current (AC) input source, the rectifier being configured to receive AC electricity from the AC input source and convert the AC electricity from the AC input source to direct current (DC) electricity;
        a DC electrical circuit comprising a first DC electrical circuit loop and a second DC electrical circuit loop, the rectifier being configured to circulate the DC electricity through the DC electrical circuit;
        a relay located within the first DC electrical circuit loop, the relay being configured to open to break the first DC electrical circuit loop and close to complete the first DC electrical circuit loop in order to reduce standby power consumption of the ECM controller;
        a DC-to-DC converter electrically connected to the rectifier, the DC-to-DC converter being configured to receive the DC electricity at a first voltage from the rectifier and convert the DC electricity from the first voltage to at least one of a second voltage or a third voltage, the second voltage and the third voltage being less than the first voltage;
        a rectifier-to-converter line electrically connecting the rectifier to the DC-to-DC converter, wherein DC electricity is configured to flow from the rectifier to the DC-to-DC converter through the rectifier-to-converter line; and
        a converter-to-rectifier line electrically connecting the DC-to-DC converter to the rectifier, wherein the DC electricity is configured to flow from the DC-to-DC converter to the rectifier through the converter-to-rectifier line,
        wherein the relay is located within the converter-to-rectifier line, the relay being configured to open the first DC electrical circuit loop within the converter-to-rectifier line and close the first DC electrical circuit loop within the converter-to-rectifier line.

2. The HVAC system of claim 1, further comprising:
    an equipment control board configured to transmit an activation signal to the relay and close the relay to complete the first DC electrical circuit loop.

3. The HVAC system of claim 2, wherein the equipment control board is configured to transmit the activation signal to the relay to close the relay and complete the first DC electrical circuit loop when activation of the blower motor is desired.

4. The HVAC system of claim 1, further comprising:
    an equipment control board or a system control unit configured to transmit an activation signal to the relay to close the relay and complete the first DC electrical circuit loop.

5. The HVAC system of claim 4, wherein the equipment control board is configured to transmit the activation signal to the relay to close the relay and complete the first DC electrical circuit loop when activation of the blower motor is desired.

6. The HVAC system of claim 1, further comprising:
an inverter electrically connected to the rectifier and the DC-to-DC converter, the inverter configured to change the DC electricity received from the rectifier and the DC-to-DC converter to AC converted electricity and provide said AC converted electricity to the blower motor.

7. The HVAC system of claim 6, further comprising:
a converter-to-processor line;
a processor-to-inverter line; and
a processor electrically connected to the DC-to-DC converter through the converter-to-processor line, the processor being configured to receive DC electricity at the third voltage from the DC-to-DC converter, wherein the processor is electrically connected to the inverter through the processor-to-inverter line and is configured to transmit a blower activation signal to the blower motor through the processor-to-inverter line and the inverter.

8. The HVAC system of claim 7, further comprising:
an equipment control board configured to transmit an activation signal to the relay to close the relay and complete the first DC electrical circuit loop, wherein the equipment control board is configured to transmit a blower activation signal to the processor.

9. The HVAC system of claim 8, wherein the equipment control board is configured to transmit the activation signal to the relay to close the relay and complete the first DC electrical circuit loop when activation of the blower motor is desired.

10. A method of operating a heating, ventilation, and air conditioning (HVAC) system, comprising:
transmitting an activation signal to a relay located within a first DC electrical circuit loop in a DC electrical circuit of an electronically commutated motor (ECM) controller, the relay being configured to close and complete the first DC electrical circuit loop in response to the activation signal;
operating a blower motor using electricity from the DC electrical circuit;
receiving, using a rectifier, AC electricity from an AC input source;
converting, using the rectifier, the AC electricity from the AC input source to DC electricity;
providing, using the rectifier, the DC electricity to the DC electrical circuit;
receiving, using a DC-to-DC converter, the DC electricity from the rectifier at a first voltage;
converting, using the DC-to-DC converter, the DC electricity from the first voltage to at least one of a second voltage and a third voltage, the second voltage and the third voltage being less than the first voltage; and
providing, using the DC-to-DC converter, the DC electricity at the second voltage to the rectifier via a converter-to-rectifier line, wherein the relay is located within the converter-to-rectifier line, the relay being configured to open the first DC electrical circuit loop within the converter-to-rectifier line and close the first DC electrical circuit loop within the converter-to-rectifier line.

11. The method of claim 10, further comprising:
converting, using an inverter, DC electricity from the DC electrical circuit to AC converted electricity; and
providing, using the inverter, the AC converted electricity to the blower motor.

12. The method of claim 10, further comprising:
transmitting a blower activation signal to a processor within the DC electrical circuit, the processor being configured to receive the DC electricity at the third voltage from the DC-to-DC converter, wherein the processor is electrically connected to an inverter through the processor-to-inverter line; and
transmitting, using the processor, the blower activation signal to the blower motor through the processor-to-inverter line and the inverter.

13. The method of claim 12, wherein the activation signal is configured to be transmitted when the blower activation signal is transmitted.

14. A computer program product embodied on a non-transitory computer readable medium, the computer program product including instructions that, when executed by a processor, cause the processor to perform operations comprising:
transmitting an activation signal to a relay located within a first DC electrical circuit loop in a DC electrical circuit of an electronically commutated motor (ECM) controller, the relay being configured to close and complete the first DC electrical circuit loop in response to the activation signal;
operating a blower motor using electricity from the DC electrical circuit;
wherein the relay is located in converter-to-rectifier line electrically connecting a DC-to-DC converter and a rectifier within the first DC electrical circuit loop, and wherein the relay is configured to open the first DC electrical circuit loop within the converter-to-rectifier line and close the first DC electrical circuit loop within the converter-to-rectifier line.

15. The computer program product of claim 14, further comprising:
transmitting a blower activation signal to a processor within the DC electrical circuit, the processor being electrically connected to an inverter through a processor-to-inverter line, wherein the inverter is configured to convert the DC electricity from the DC electrical circuit to AC converted electricity and provide said AC converted electricity to the blower motor; and
transmitting, using the processor, the blower activation signal to the blower motor through the processor-to-inverter line and the inverter.

16. The computer program product of claim 15, wherein the activation signal is configured to be transmitted when the blower activation signal is transmitted.

* * * * *